(12) United States Patent
Kuper (10) Patent No.: US 7,191,968 B2
(45) Date of Patent: Mar. 20, 2007

(54) SYSTEM FOR HANDLING WELDING WIRE AND METHOD OF HANDLING WELDING WIRE USING THE SYSTEM

(75) Inventor: Dieter Kuper, Grayslake, IL (US)

(73) Assignee: National Standard Company, Niles, MI (US)

(*) Notice: Subject to any disclaimer, the term of this patent is extended or adjusted under 35 U.S.C. 154(b) by 11 days.

(21) Appl. No.: 10/848,634

(22) Filed: May 19, 2004

(65) Prior Publication Data

US 2005/0258290 A1   Nov. 24, 2005

(51) Int. Cl.
 *B65H 55/00* (2006.01)
(52) U.S. Cl. ...................... 242/171; 206/409
(58) Field of Classification Search ........... 242/171, 242/170; 206/389, 409
See application file for complete search history.

(56) References Cited

U.S. PATENT DOCUMENTS

| | | | |
|---|---|---|---|
| 2,580,900 A * | 1/1952 | Epstein ............ 206/409 |
| 4,143,257 A | 3/1979 | Herrmann |
| 4,196,333 A | 4/1980 | Emmerson |
| 4,253,624 A | 3/1981 | Colbert |
| 4,451,014 A * | 5/1984 | Kitt et al. ......... 242/128 |
| 4,456,198 A | 6/1984 | Kosch |
| 4,465,246 A | 8/1984 | Kosch |
| 4,508,291 A | 4/1985 | Kosch |
| 4,582,198 A * | 4/1986 | Ditton ............. 206/395 |
| 4,602,753 A | 7/1986 | Kosch |
| 4,657,204 A * | 4/1987 | Colbert ............ 242/128 |
| 4,681,277 A | 7/1987 | Kosch |
| 4,869,367 A * | 9/1989 | Kawasaki et al. ... 206/409 |
| 4,956,541 A * | 9/1990 | Hiltunen ........... 219/137.61 |
| 5,013,879 A | 5/1991 | Lind |
| 5,277,314 A * | 1/1994 | Cooper et al. ...... 206/398 |
| 5,465,917 A | 11/1995 | Kosch |
| 5,553,810 A | 9/1996 | Bobeczko |
| 5,584,426 A | 12/1996 | Ziesenis |
| 5,588,372 A | 12/1996 | Kelly |
| 5,692,700 A | 12/1997 | Bobeczko |
| 5,746,380 A * | 5/1998 | Chung ............. 242/171 |
| 5,758,834 A * | 6/1998 | Dragoo et al. ...... 242/128 |
| 5,971,308 A | 10/1999 | Boulton |
| 6,062,386 A | 5/2000 | Inoue et al. |
| 6,286,748 B1 | 9/2001 | Cooper |
| 6,484,964 B1 | 11/2002 | Cooper |
| 6,715,608 B1 * | 4/2004 | Moore ............. 206/397 |
| 2001/0006184 A1* | 7/2001 | Ohike et al. ....... 228/33 |
| 2003/0052030 A1* | 3/2003 | Gelmetti .......... 206/397 |
| 2004/0211851 A1* | 10/2004 | Barton et al. ...... 242/171 |

* cited by examiner

*Primary Examiner*—Patrick Mackey
*Assistant Examiner*—William E. Dondero
(74) *Attorney, Agent, or Firm*—Wood, Phillips, Katz, Clark & Mortimer (57) ABSTRACT

A coiled supply of welding wire in combination with a container. The container has a main body defining an upwardly opening receptacle with bottom wall and a radially inwardly facing surface on a peripheral wall extending upwardly from the bottom wall. The container has a top opening for accessing the coiled supply of welding wire within the receptacle. The container has a lid that at least partially blocks the top opening. The lid has a guide opening through which a free end of the welding wire is directed from the receptacle to externally thereof and through which the welding wire in the coiled supply of welding wire is drawn to cause the welding wire to pay off of the coiled supply of welding wire. The lid has a wall with a downwardly facing surface portion that is substantially flat.

36 Claims, 4 Drawing Sheets

SYSTEM FOR HANDLING WELDING WIRE AND METHOD OF HANDLING WELDING WIRE USING THE SYSTEM

BACKGROUND OF THE INVENTION

1. Field of the Invention

This invention relates to welding wire and, more particularly, to welding wire that is coiled in bulk quantities for dispensing.

2. Background Art

It is well known in the welding field to perform welding operations utilizing a continuous length of metal wire. Typically, the wire is wrapped in coiled form around a spool made from wood, or the like. The spool consists of a cylindrical core and axially spaced flanges which cooperatively define a storage space for the welding wire.

The wire is wrapped around the spool by the supplier and commonly placed in a surrounding container. Depending upon the nature of the wire, and its length, the combined weight of the spool and wire may range from several hundred pounds to 1500 pounds, or more. To transport the loaded spool, it is common to place one of the flange surfaces facially against a pallet, whereby the loaded spool can be maneuvered using forklifts or other conventional transporting machinery.

At the point of use, the loaded spool is situated for dispensing the wire in any of a number of different ways. Most commonly, a shaft is directed through the spool core and oriented so that the spool can be rotated around a horizontal axis to dispense the wire. Oft times, fairly elaborate feeding mechanisms are utilized to controllably pay off wire from the spool. An exemplary system, of this type, is shown in U.S. Pat. No. 6,484,964.

There are two primary drawbacks with this type of wire dispensing process. First of all, the loaded spools must be changed from an orientation in which they reside as they are shipped, with the spool axis vertically oriented upon a pallet, to one in which the spool axis is horizontally oriented and parallel to a shaft relative to which the spool can rotate in operation. Given the potential weight of the loaded spool, the setup of the loaded spool may be difficult and time consuming. Additionally, there is an inherent danger associated with moving the heavy, loaded spools.

The feeding mechanisms also represent an additional expense and inconvenience at setup. A significant amount of down time may result as a spent spool is replaced with a loaded spool.

Another known system for dispensing welding wire does not require reorientation of the loaded spool that is transported, as described above, on a shipping pallet. This type of system is shown in each of U.S. Pat. Nos. 5,277,314 and 5,758,834. In each of these patents, a cylindrical outer container is shown having an associated upper lid. In each of these systems, a special insert is required to control the path of the welding wire between a coiled supply thereof and a guide opening through the lid to allow the wire to pay off of the spool through the lid. In each system, the end user is required to prepare the container in a manner that allows the spool to be paid out through the lid. Aside from the inconvenience, there is the potential that the system may not be properly set up at the user's site, in which event the wire will not pay off of the spool in the intended manner. Additionally, a significant amount of time may be lost during the setup. In the event that the end user does not properly set the system up, he/she may ultimately default to removing the loaded spool from the container and effecting dispensing through a system of the type shown in U.S. Pat. No. 6,484,964, described above, or otherwise.

Another system for dispensing welding wire is shown in U.S. Pat. No. 5,971,308, owned by the Assignee herein. In this system, a coiled supply of welding wire is situated so that the spool axis is vertically oriented. A movable wire guide assembly is situated vertically above the active spool and includes a conduit to direct the welding wire controllably in a path that allows continuous feed thereof. The system requires a dedicated feed structure as well as initial setup preparatory to use.

Other systems which control pay out of welding wire from a spool, situated with its axis vertically oriented, are shown in U.S. Pat. Nos. 4,253,624; 4,456,198; 4,465,246; 4,508,291; 4,602,753; 4,657,204; 4,681,277; and 5,465,917. Each system requires the incorporation of a guide structure into the spool upon which the welding wire is wound. The operator is required to set up each individual spool with the dispensing guide before the welding wire can be drawn off of the spool.

The industry continues to seek out ways of dispensing welding wire from a bulk supply thereof as efficiently and economically as possible without compromising the performance of welding operations using the dispensed welding wire.

SUMMARY OF THE INVENTION

In one form, the invention is directed to the combination of a coiled supply of welding wire and a container. The container has a main body defining an upwardly opening receptacle with a vertical center axis and bounded by an upwardly facing first surface on a bottom wall and a radially inwardly facing surface on a peripheral wall extending upwardly from the bottom wall. The container has a top opening in communication with the receptacle for accessing the coiled supply of welding wire in an operative position within the receptacle. In the operative position, the coiled supply of welding wire bears on the upwardly facing first surface of the bottom wall and coils of the coiled supply of welding wire extend around the center axis. The container has a lid that at least partially blocks the top opening. The lid has a guide opening through which a free end of the welding wire is directed from the receptacle to externally thereof and through which the welding wire in the coiled supply of welding wire is drawn to cause the welding wire to pay off of the coiled supply of welding wire. The lid has a wall with a downwardly facing surface portion that is substantially flat and resides in a plane that is substantially orthogonal to the center axis of the container receptacle. The top opening has a first area. The downwardly facing surface portion of the wall extends over a substantial portion of the first area.

In one form, the downwardly facing surface portion of the lid wall extends over substantially the entire first area.

In one form, the coiled supply of welding wire consists of a spool around which the welding wire is wrapped. The spool has a core with a central axis and first and second flanges connected to the core at first and second locations spaced axially relative to the central axis.

In one form, the first flange is above the second flange with the coiled supply of welding wire in the operative position. The first flange has a peripheral edge, with the peripheral edge spaced from the radially inwardly facing second surface substantially fully around the vertical center axis.

In one form, the downwardly facing surface portion and first flange are spaced vertically from each other a distance of at least 7 inches.

This distance may exceed 7 inches and, in one form, is not greater than 15 inches.

The guide opening may be adjacent to or coincident with the vertical center axis.

The container may further include a nozzle at the guide opening through which the welding wire passes.

In one form, the nozzle has a through passageway bounding the guide opening and the through passageway is bounded by a surface defined by a ceramic material.

In one form, there is no structure in the receptacle other than the spool to guide passage of the welding wire between the spool and the guide opening.

The lid may be removably connectable with the main body of the container.

In one form, the receptacle defined by the main body has a substantially uniform first cross-sectional configuration bounded by the radially inwardly facing second surface, as viewed in a plane taken orthogonally to the vertical center axis between the bottom wall and a top edge. The top opening has a second cross-sectional configuration substantially matched to the first cross-sectional configuration. The downwardly facing surface portion extends over substantially the entire first area of the top opening and is at, or adjacent to, the top edge of the main body of the container.

The lid and main body of the container may be telescopingly engaged, one within the other.

In one form, the main body of the container and one of the first and second flanges cooperate to maintain a predetermined relationship between the main body and the one of the first and second flanges.

In one form, with the main body and the one of the first and second flanges in the predetermined relationship, the central axis of the core and vertical center axis for the receptacle are substantially coincident.

In one form, the coiled supply of welding wire has a free end and a discrete length of the coiled supply of welding wire adjacent the free end is extended through the guide opening and releasably maintained in a shipping state at an outside region of the container.

The discrete length of the coiled supply of welding wire in the shipping state may be taped to the lid.

In one form, the coiled supply of welding wire is not wrapped around a spool.

In one form, there is no structure in the receptacle to guide passage of the welding wire between the coiled supply of welding wire and the guide opening.

In one form, the radially inwardly facing second surface is polygonally shaped as viewed in cross section in a plane that is orthogonal to the vertical center axis.

The invention is further directed to the combination of a coiled supply of welding wire and a container having a main body defining an upwardly opening receptacle with a vertical center axis and bounded by an upwardly facing first surface on a bottom wall and a radially inwardly facing second surface on a peripheral wall extending upwardly from the bottom wall. The main body has a top opening with a first area in communication with the receptacle for accessing the coiled supply of welding wire in an operative position within the receptacle, wherein the coiled supply of welding wire bears on the upwardly facing first surface of the bottom wall and coils of the coiled supply of welding wire extend around the center axis. The container further has a lid that at least partially blocks the top opening. The lid has a guide opening through which a free end of the welding wire is directed from the receptacle to externally thereof and through which the welding wire in the coiled supply of welding wire is drawn to cause the welding wire to pay off of the coiled supply of welding wire. There is no structure in the receptacle between the coiled supply of welding wire and guide opening to guide passage of the welding wire between the coiled supply of welding wire to the guide opening.

In one form, the downwardly facing surface portion of the lid wall extends over substantially the entire first area.

The coiled supply of welding wire may include a spool around which the welding wire is wrapped. The spool has a core with a central axis and first and second flanges connected to the core at first and second locations spaced axially relative to the central axis.

The container may further include a nozzle bounding the guide opening through which the welding wire passes.

The lid may be removably connectable with the main body of the container.

In one form, the receptacle defined by the main body has a substantially uniform first cross-sectional configuration bounded by the radially inwardly facing second surface, as viewed in a plane taken orthogonally to the vertical center axis, between the bottom wall and a top edge. The top opening has a cross-sectional configuration substantially matched to the first cross-sectional configuration. The downwardly facing surface portion extends over substantially the entire first area of the top opening and is at or adjacent the top edge of the main body of the container.

In one form, the lid and main body of the container are telescopingly engaged, one within the other.

In one form, the coiled supply of welding wire and main body of the container cooperate to maintain a predetermined relationship between the main body and the coiled supply of welding wire.

The coiled supply of welding wire has a free end. A discrete length of the coiled supply of welding wire adjacent the free end is extended through the guide opening and releasably maintained in a shipping state at an outside region of the container.

The discrete length of the coiled supply of welding wire in the shipping state may be taped to the lid.

In one form, the coiled supply of welding wire is not wrapped around a spool.

The invention is further directed to a method of handling welding wire. The method includes the steps of: providing a coiled supply of welding wire having a central axis around which the welding wire is wrapped; placing the coiled supply of welding wire in an operative position in a receptacle defined by a container having a wall structure;

transporting the container with the coiled supply of welding wire in the operative position to a user site; directing a free end of the welding wire through the wall structure of the container; and causing the welding wire to be paid off of the coiled supply of welding wire by exerting a tensile force on the welding wire directed through a guide opening in the wall structure without requiring the welding wire to be guided by any structure between the coiled supply of welding wire and the guide opening.

The step of directing the free end of the welding wire through the guide opening may be carried out before the step of transporting the container to the user site.

The method may further include the step of releasably securing a portion of the welding wire at or adjacent to the free end of the welding wire, which is directed through the guide opening, to the wall structure at an external location thereon.

The method may further include the step of releasing the portion of the welding wire secured at the external location on the wall structure at the user site before causing the welding wire to be paid off of the coiled supply of welding wire.

The method may include the steps of providing a main body that defines at least a part of a receptacle and a lid on the main body to define the wall structure.

The lid may be releasably connectable to the main body.

The step of directing the free end of the welding wire through the guide opening may involve directing the free end of the welding wire through the lid.

The step of providing a main body may involve providing a bottom wall and a peripheral wall that extends upwardly from the bottom wall to a free edge that extends around a top opening in communication with the receptacle. The step of providing a lid may involve providing a lid with a wall that spans the free edge to block the top opening.

The wall on the lid may have a substantially flat, downwardly facing surface that spans the free edge.

The lid and main body may be telescopingly engageable, one with the other.

The step of providing a coiled supply of welding wire may involve providing a spool with a core around which the welding wire is wrapped.

The step of providing a coiled supply of welding wire may involve providing a coiled supply of welding wire without a spool.

The invention is further directed to a method of handling welding wire. The method includes the steps of: providing a coiled supply of welding wire having a central axis around which the welding wire is wrapped; placing the coiled supply of welding wire in an operative position in a receptacle defined by a container having a wall structure; transporting the container with the coiled supply of welding wire in the operative position to a user's site; directing a free end of the welding wire through a guide opening in the wall structure of the container; releasably securing a portion of the welding wire at or adjacent to the free end of the welding wire that is directed through the guide opening to the wall structure at an external location thereon before transporting the container to a user's site; at the user's site, releasing the part of the welding wire secured at the external location on the wall structure; and causing the welding wire to be paid off of the coiled supply of welding wire by exerting a tensile force on the welding wire projecting through the guide opening in the wall structure.

The step of releasably securing a portion of the welding wire may involve taping a portion of the welding wire to the wall structure.

DETAILED DESCRIPTION OF THE DRAWINGS

Figure 1:
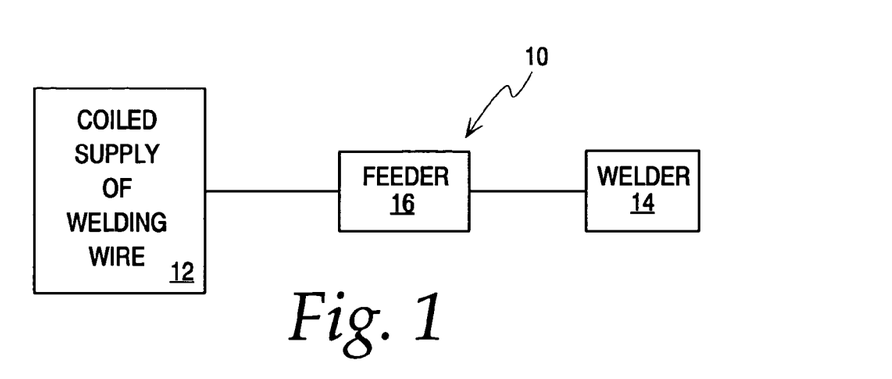
FIG. 1 is a schematic representation of a welding system, including a coiled supply of welding wire that is drawn by a feeder for use by a piece of welding equipment.

As seen in FIG. 1, the present invention is usable in a welding system, as shown at 10. The welding system 10 consists of a supply of welding wire 12, which is coiled either with or without an underlying spool. The welding wire 12 is drawn from the coiled supply thereof for use by a welder 14, which can take any of myriad different forms, well known to those skilled in the art. The operator may manually draw the welding wire 12 from the supply or, more commonly, the welding wire 12 is continuously drawn off of the supply thereof by a feeder 16 to facilitate the performance of either automatic or semi-automatic welding operations. The welding wire 12 may be fed, for example, to welding guns that are used with robotic welders to construct frames for vehicles in the automotive industry.

Figure 2:
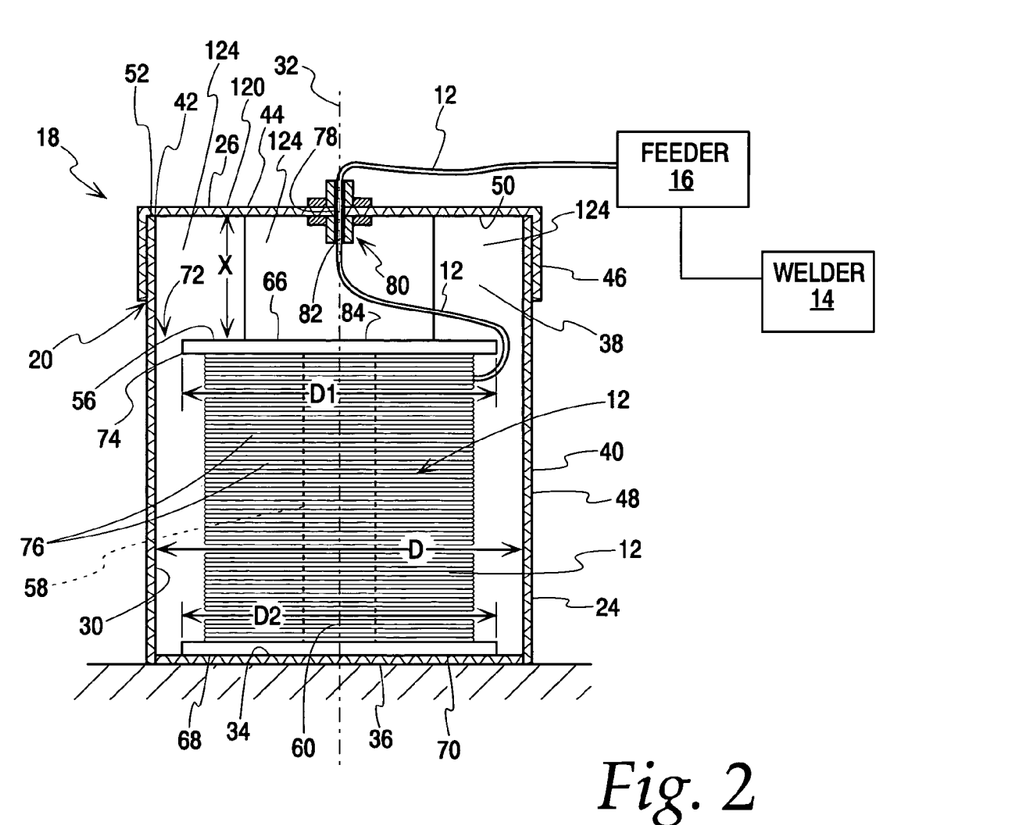
FIG. 2 is a cross-sectional view of a container, according to the present invention, and consisting of a main body, defining a receptacle for the coiled supply of welding wire, and a lid with a guide opening through which the welding wire from the coiled supply is routed to be directed externally for controlled use thereof.

As seen in FIG. 2, the invention is concerned principally with a dispensing container at 18 and the handling of a coiled supply of the welding wire 12 using the container 18. The container 18 has a wall structure 20 defined cooperatively by a main body 24 and a cooperating lid 26. The main body 24 defines an upwardly opening receptacle 30 with a vertical center axis 32. The receptacle 30 is bounded by an upwardly facing surface 34 on a bottom wall 36 and a radially inwardly facing surface 38 on a peripheral wall 40 extending upwardly from the bottom wall 36. The main body 24 has a top opening 42 in communication with the receptacle 30, through which the coiled supply of welding wire 12 can be introduced to the receptacle 30 and placed in the operative position of FIG. 2. In the operative position, the coiled supply of welding wire 12 bears on the upwardly facing surface 34 of the bottom wall 36.

The main body 24 can be made from any suitable material, which is selected depending upon whether the container 18 is intended to be disposed of after a single use or reused. One suitable material is cardboard, however, this should not be viewed as limiting.

The lid 26 has a wall 44, which at least partially, and preferably fully, blocks the top opening 42. The lid 26 has a continuous, depending skirt 46 which closely surrounds the peripheral outer surface 48 of the wall 40 so that the lid 26 and main body 24 can be telescopingly engaged, one within the other, and frictionally maintained in the assembled state shown in FIG. 2. The lid wall 44, in this embodiment, has a flat shape with a flat, downwardly facing surface 50 that spans, and bears downwardly against, a top edge 52 of the main body 24 at the top opening 42. The downwardly facing surface 50 resides in a plane that is substantially orthogonal to the vertical center axis 32.

In this embodiment, the coiled supply of welding wire 12 is formed around a spool 56. The spool 56 consists of a core 58 with a central axis 60 that is coincident with the center axis 32 for the receptacle 30. The spool 56 has first and second flanges 66,68, axially spaced relative to the central axis 60 of the spool 56. With the coiled supply of welding wire 12 in the operative position of FIG. 2, a surface 70 on the second flange 68 abuts to the upwardly facing surface 34 on the bottom wall 36 of the main body 24 so that the spool central axis 60 is substantially coincident with the vertical center axis 32 of the receptacle 30.

As explained in greater detail below, the receptacle 30 has an effective diameter D, that is preferably uniform from top to bottom, with the first and second flanges 66,68 having respective diameters D1 and D2. The diameter D1 is less than the diameter D so that a peripheral gap at 72 is maintained between the peripheral edge 74 of the first flange 66 and the radially inwardly facing surface 38 on the main body 24. With this arrangement, the individual coils/turns 76 of the welding wire 12, wrapped around the spool core 58 and the central axis 60 thereof, are allowed to pass through the gap 72 and extend upwardly and through the lid wall 44 to be accessible for use. A radial gap is maintained between the radially outwardly facing outside of the coiled supply of welding wire and radially inwardly facing surface 38 on the peripheral wall 40, within which gap the welding wire 12 is allowed to unwind.

More particularly, the lid wall 44 has a guide opening 78 therethrough that is either at, or adjacent to, the center axis 32 of the receptacle 30, with the main body 24 and lid 26 in the assembled state of FIG. 2. As explained in greater detail below, a nozzle 80 is incorporated into the lid wall 44 and defines a vertically extending passageway 82 for guiding the welding wire 12 through the lid wall 44. Since the nozzle 80 bounds the guide opening 78 through the lid wall 44, the nozzle passageway 82 will be considered herein to be an extension of the guide opening 78.

It has been determined that by maintaining a distance X, between a top surface 84 of the first flange 66 on the spool 56 and the downwardly facing surface 50 on the lid wall 44, in the range of 7–15 inches, the welding wire 12 will flex into the shape shown between the spool 56 and feeder 16 without permanently changing its initially set, straight shape. That is, the wire 12 can depart from the coiled supply thereof on the spool 56, bend around the peripheral edge 74 of the flange 66, and extend through the gap 72 and from there radially inwardly and upwardly into and through the guide opening/passageway 82 to project externally of the receptacle 30 for engagement, as by the feeder 16, without appreciably altering the initial set for the wire 12. The above-noted dimensions are of course dependent upon the diameter D1 for the spool 56, the gauge of the welding wire 12, etc. The range of 7–15 inches is exemplary for a typical diameter D1 on the order of 24" and a gauge of wire in the range of 20 AWG to 12 AWG. One skilled in the art would know to make appropriate changes from these basic dimensions for different types of welding wire and diameters of spools, corresponding to the spool 56.

It should also be noted that the vertical dimension X is affected by the extent to which the nozzle 80 depends downwardly from the surface 50. In FIG. 1, this dimension is somewhat exaggerated to show the details of the nozzle 80. The distance X would have to be increased proportionately in the event the wire 12 entered the guide opening/passageway 82 a substantial distance below the surface 50.

It has been found, unexpectedly, that with the configuration shown in FIG. 2, and described above, there is no need for any guide structure to redirect the welding wire between the spool 56 and guide opening/passageway 82 as has been commonly utilized in the past. Accordingly, the dispensing container 18 lends itself to being used in practicing a unique method of handling a coiled supply of welding wire.

Figures 3, 4:
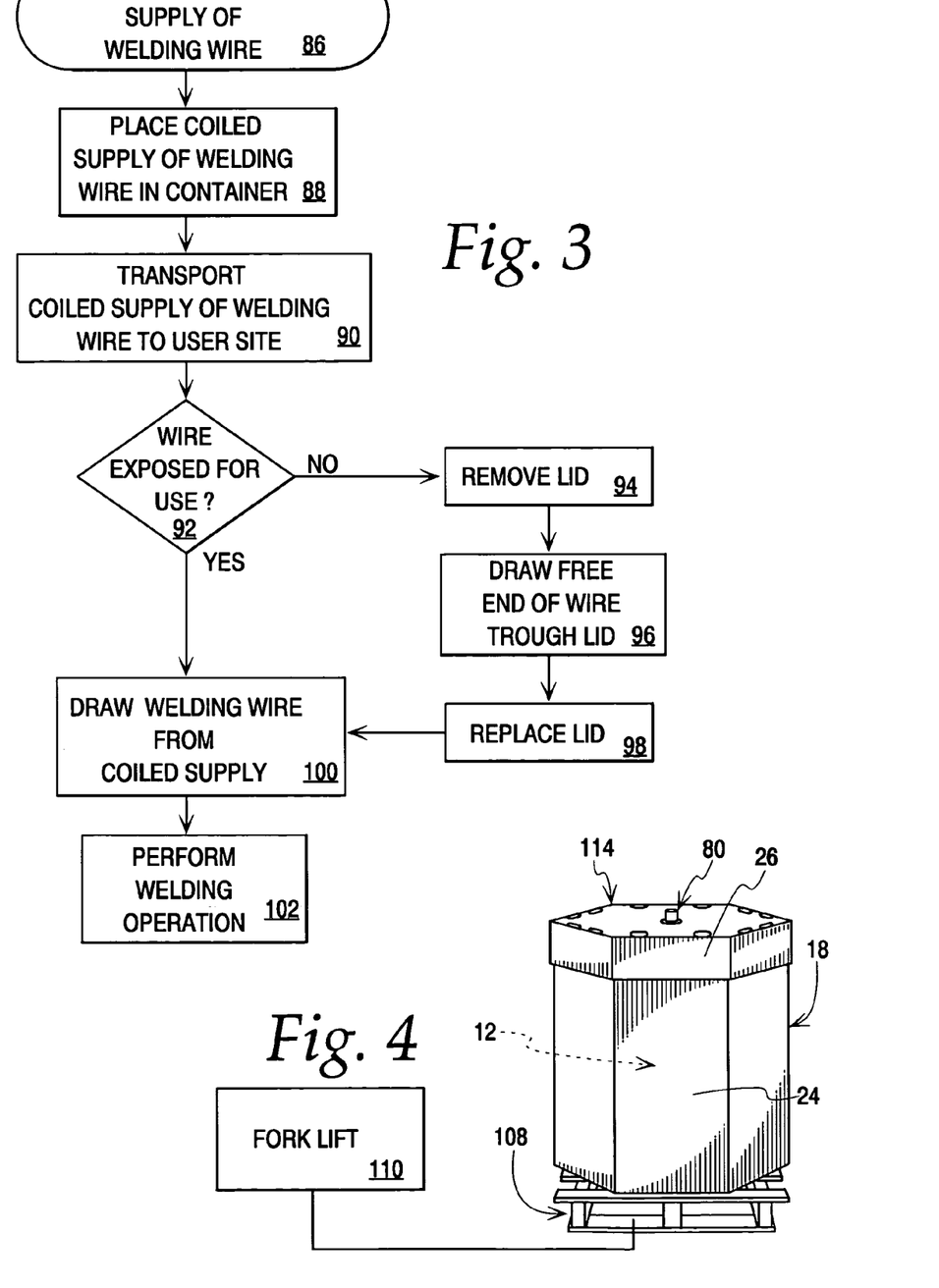
FIG. 3 is a flow diagram representing a method of handling welding wire, according to the present invention.
FIG. 4 is a reduced, perspective view of the container in FIG. 2, operatively positioned on a pallet that can be engaged by a forklift.

More specifically, as shown in flow diagram form in FIG. 3, a coiled supply of welding wire is provided, as shown at block 86. As shown at block 88, the coiled supply of welding wire 12 is then placed in the receptacle 30 of the dispensing container 18 in the operative position shown in FIG. 2. The coiled supply of welding wire 12, in the operative position in the dispensing container 18, can then be transported to a user's site, as indicated at block 90. At the user's site, the coiled supply of welding wire in the container 18 can be placed at the intended use location. As shown at block 92, a determination is then made as to whether the wire 12 has been directed through the lid wall 44 to be exposed for use. If the welding wire 12 has not been exposed, the lid 26 is removed, as shown at block 94, and the free end of the welding wire 12 is drawn through the lid 26, as shown at block 96. Thereafter, the lid 26 is replaced on the main body 24, as shown at block 98. The welding wire 12 can then be drawn from the coiled supply thereof, as shown at block 100. The welding wire 12 can be drawn manually from the coiled supply thereof, or through an appropriate feeder 16, as previously discussed. The welding wire 12 then is used to perform a welding operation, of any type, as shown at 102. If, as indicated at block 92, it is determined that the welding wire 12 was exposed through the lid 26 at the time of delivery to the user's site, there is no need to effect removal of the lid 26, thereby allowing the user to draw the welding wire 12 off of the coiled supply thereof preparatory to performing a welding operation, as shown at block 102.

As shown in FIG. 4, with the coiled supply of wire 12 in the operative position in the dispensing container 18, and the lid 26 and main body 24 in the assembled state, the dispensing container 18 can be placed on a conventional pallet at 108. The pallet 108 can be engaged by a conventional forklift 110 to transport the same through all phases of operation. That is, the combined package at 114, in the FIG. 4 state, to include the container 18 and coiled supply of wire 12, can be moved around the supplier's facility and loaded to an appropriate transporting vehicle, using the pallet 108. At the user's site, the package 114 can be unloaded from the transporting vehicle and maneuvered around the working site in the same manner.

Figure 5:
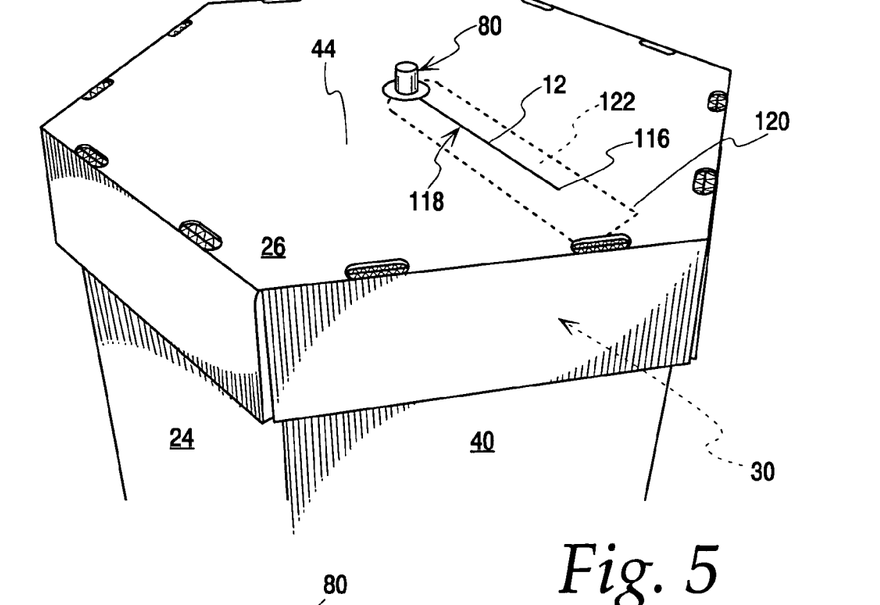
FIG. 5 is an enlarged, fragmentary, perspective view of the top of the container in FIGS. 2 and 4 and showing a nozzle on a lid through which the welding wire is directed with a discrete portion of the welding wire at the free end thereof taped to the lid.

As shown also in FIG. 5, for added convenience to the end user, the free end 116 of the welding wire 12 can be drawn out through the nozzle 80 so that a discrete length at 118 of the welding wire 12 is exposed externally of the receptacle 30. The discrete length of wire at 118 can be placed in a shipping state by bending the wire 12 so that it lies against the upwardly facing surface 120 of the lid wall 44. The discrete length 118 of the wire 12 can be releasably maintained in the shipping state, as by a piece of tape 122 that is adhered to the upwardly facing surface 120. At the user's site, the user can conveniently tear the tape 122 off of the lid surface 120 to begin dispensing the wire 12. Other means for releasably maintaining the wire 12 in the shipping state are contemplated.

As seen in FIGS. 2 and 5, in a preferred form, the peripheral wall 40 of the main body 24 has a polygonal shape, in this case in the form of a hexagon. With the hexagonal shape, six flat surfaces 124 (three shown in FIG. 2) are situated adjacent to the peripheral edge 74 of the first flange 66. The surfaces 124 limit radial expansion of the coils/turns 76 of the welding wire 12 and the portion of the welding wire 12 extending through the peripheral gap 72 at multiple circumferential locations so that there is a smooth paying off of the welding wire 12 from the spool 56 as the coils/turns 76 unwrap and move around the peripheral edge 74. At the same time, this arrangement avoids binding of the welding wire 12 between the peripheral edge 74 of the first flange 66 and the radially inwardly facing surface 38 on the peripheral wall 40.

The lid 26 has a shape that is complementary to that of the main body 24. That is, the depending skirt 46 has a hexagonal configuration that closely surrounds, and is keyed against rotation relative to, the peripheral outer surface 48 of the container wall 40. While the polygonal shape is desirable, it does not require that the number of sides be selected to be six in number. A lesser or greater number of sides is contemplated and would function similarly.

Figure 6:
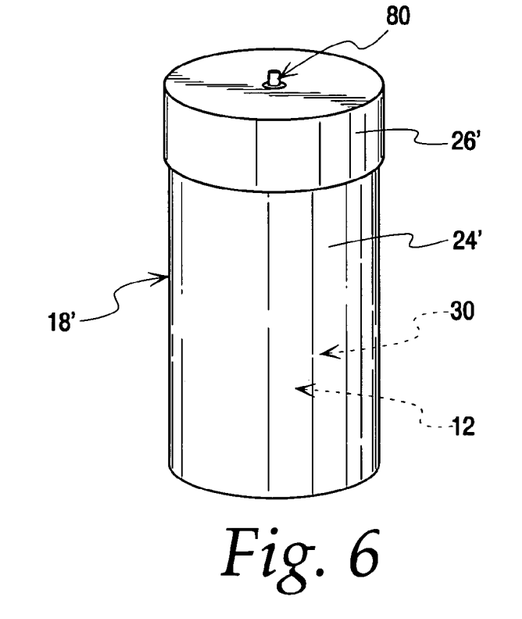
FIG. 6 is a view as in FIG. 4 of a modified form of container, according to the present invention, with a coiled supply of welding wire in a receptacle defined thereby.

The invention also contemplates a nonpolygonal shape for the main body and lid. In FIG. 6, a dispensing container 18' is shown with a cylindrical main body 24' and a complementarily-shaped lid 26'. The main body 24' and lid 26' are telescopingly engaged, one within the other. The main body 24' defines a receptacle 30' for the coiled supply of welding wire 12.

Figure 7:
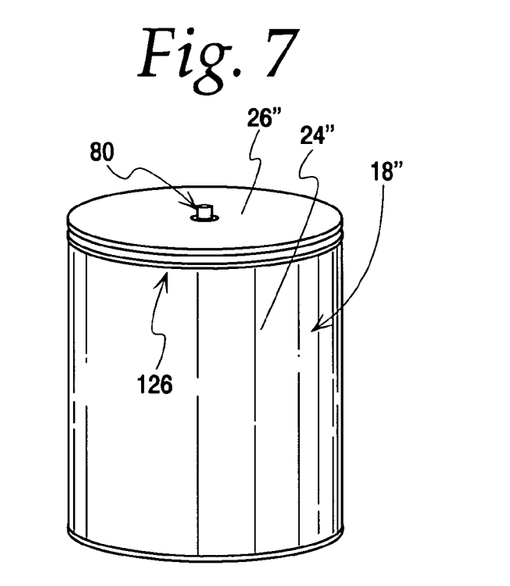
FIG. 7 is a view as in FIG. 6 of a further modified form of container, according to the present invention.

A further modified form of dispensing container is shown at 18" in FIG. 7. The container 18" has a main body 24" in the form of a drum, with a cylindrical shape and a lid 26" fit thereto and maintained in place by a band assembly 126. The band assembly 126, which may have a conventional construction, may permanently, or releasably, secure the lid 26" to the main body 24". The main body 24" may be made from a heavier material to support a spool-less supply of welding wire 12, as described below.

Figure 8:
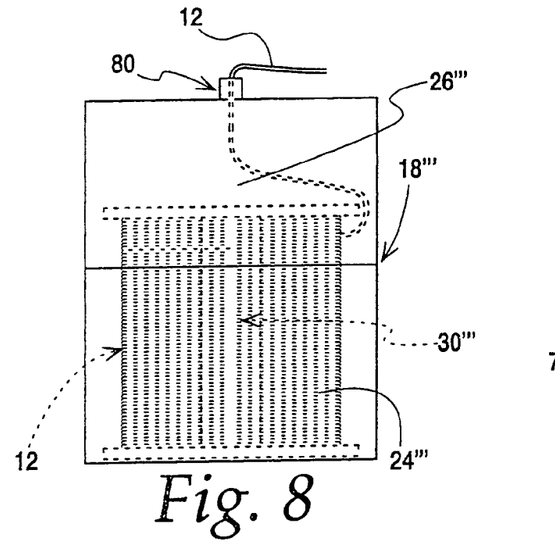
FIG. 8 is an elevation view of a further modified form of container, according to the present invention, with a coiled supply of welding wire in a receptacle defined thereby.

A further modified form of container is shown at 18'" in FIG. 8. The container 18'" has a main body 24'" and lid 26'" which are placed in an assembled state. In this embodiment, the lid 26'" has a substantial vertical extent so that it defines a significant portion of the receptacle 30'", for the coiled supply of wire 12. The main body 24'" defines the remainder of the receptacle 30'".

Figure 9:
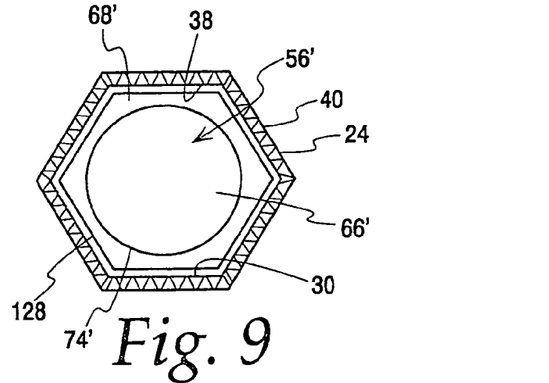
FIG. 9 is a reduced, cross-sectional view of the container in FIG. 2, viewed from overhead and with a modified form of spool, for a coiled supply of wire, in an operative position therewithin, wherein a flange on the spool is keyed to the container against rotation around a vertical axis.

While conventional spool configurations, such as that shown at 56, can be utilized, the invention contemplates utilizing variations thereof. For example, as shown in FIG. 9, a spool 56' can be constructed with differently configured first and second flanges 66',68'. The flange 68' can be configured to nominally match the hexagonal shape of the inwardly facing surface 38 of the peripheral wall 40 on the main body 24. The peripheral edge 128 of the flange 68' cooperates with the surface 38 to center the flange 68' within the receptacle 30 and key the flange 68' and main body 24 against relative rotational shifting about a vertical axis. The flange 66' can be made with a circular peripheral edge 74' corresponding to that shown in FIG. 2.

Figure 10:
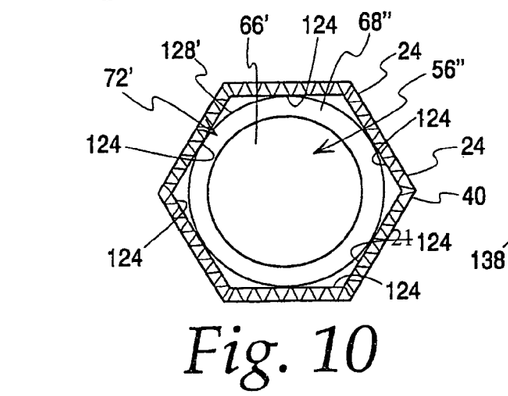
FIG. 10 is a view as in FIG. 9 with a further modified form of spool, wherein the bottom flange thereon engages the container so as to be centered therewithin.

Alternatively, as shown in FIG. 10, a spool 56" can be used with a flange 68" that has a circular peripheral edge 128' that abuts, or is in close proximity to, the surfaces 124 on the peripheral wall 40 of the main body 24. A flange 66' has a smaller diameter to allow formation of an adequate peripheral gap 72' to accept the welding wire 12.

Figure 11:
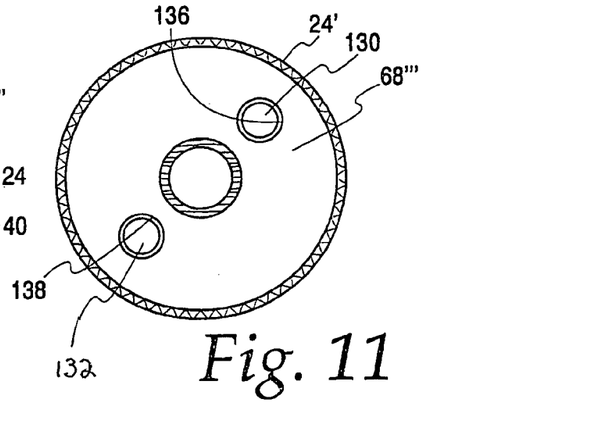
FIG. 11 is a view as in FIGS. 9 and 10 of the container as in FIGS. 6 and 7 with a bottom spool flange keyed to the container in centered relationship therewith.

The invention contemplates other centering structure. Virtually any structure cooperating between a spool and dispensing container to accomplish this is contemplated by the invention. As a further example, as shown in FIG. 11, the main body 24' of FIG. 6 is shown with diametrically opposite projections 130,132 which are received in complementary receptacles 136,138, respectively, in a flange 68'".

Figure 12:
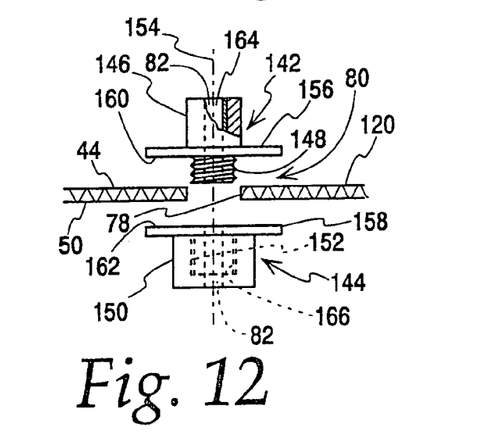
FIG. 12 is an enlarged, exploded, fragmentary, front elevation view of the nozzle on the container in FIGS. 2 and 4–8.

Details of the exemplary nozzle 80 are shown in FIG. 12. The nozzle 80 consists of joinable male and female parts 142,144, respectively. The male part 142 has a cylindrical body 146 which has an externally threaded end 148. The female part 144 has a like cylindrical body 150 with an internally threaded, blind bore 152 to accept the externally threaded end 148.

The threaded end 148 can be directed through the guide opening 78 in the lid wall 44 and into the threaded blind bore 152. By then relatively rotating the male and female parts 142,144 around the axis 154, radially enlarged flanges 156,158, on the male and female parts 142,144, respectively, can be drawn towards each other to captively embrace the lid wall 44. More specifically, an annular surface 160 on the flange 156 is borne facially against the upwardly facing surface 120 of the lid wall 44, with an annular surface 162 on the flange 158 borne facially against the downwardly facing surface 50 on the lid wall 44. The flanges 156,158 stabilize the nozzle 80 and reinforce the lid wall 44 which, as previously mentioned, may be made from cardboard, or other material. Once the male and female parts 142,144 are joined, the continuous guide opening/passageway 82 is formed cooperatively thereby.

The passageway 82 may be bounded by hardened inserts 164,166 on the male and female parts 142,144, respectively. The inserts 164,166 may be made, for example, from a ceramic material, or other material that will offer little frictional resistance to the moving welding wire 12 and will not show appreciable wear as the welding wire 12 from an entire supply thereof is exhausted.

Figure 13:
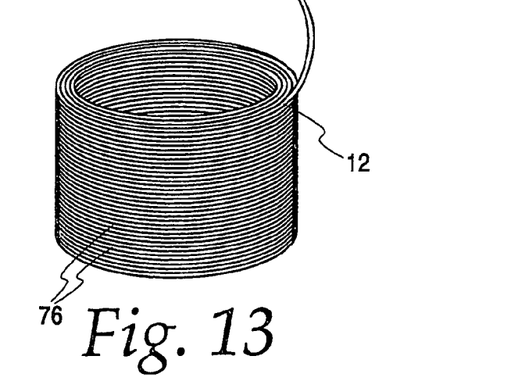
FIG. 13 is a perspective view of a coiled supply of wire, usable with the present invention, that is formed into the depicted shape without a spool.

As previously mentioned, the coiled supply of welding wire 12 need not be formed around a spool 56. As shown in FIG. 13, the coiled wire 12 can be wrapped into a generally annular shape, having a radially inwardly facing inside and radially outwardly facing outside, that is directed into the receptacle 30 without the requirement of a spool. However, a spool-less construction is not preferred in that it is more difficult to provide a structure that has a predictable annular shape for reception into the receptacle 30.

With the spool-less construction, a drum-type configuration, as shown in FIG. 7 and previously described, may be utilized. No special configurational variations, from those discussed above, are required. However, typically the drum/main body 24" will be made with a heavier material since the drum/main body 24" will be required to support and confine the coiled wire 12 therewithin. Of course, this body 24" could be used with a coiled supply of wire 12 on a spool 56.

The inventive concept can be used to handle virtually all types of welding wire in many different industries, including but not limited to, low carbon steel wire, both in a coated and uncoated form. The invention also contemplates utilizing the structure and process, as described above, to handle wire for other applications, such as electrical wire, with and without insulation. Consequently, as used throughout, the term "welding wire" is intended to encompass virtually any flexible wire that can be coiled and drawn out of the coiled state for dispensing.

While the invention has been described with particular reference to the drawings, it should be understood that various modifications could be made without departing from the spirit and scope of the present invention.

The invention claimed:

1. In combination:

a coiled supply of welding wire; and a container having a main body defining an upwardly opening receptacle with a vertical center axis and bounded by an upwardly facing first surface on a bottom wall and a radially inwardly facing second surface on a peripheral wall extending upwardly from the bottom wall and having a top edge, the coiled supply of welding wire having a radially inwardly facing inside and a radially outwardly facing outside, the radially outwardly facing outside of the coiled supply of welding wire spaced from the radially inwardly facing second surface so that a radial gap is defined between the radially outwardly facing outside of the coiled supply of welding wire and the radially inwardly facing second surface, the main body having a top opening in communication with the receptacle and for accessing the coiled supply of welding wire in an operative position within the receptacle wherein the coiled supply of welding wire bears on the upwardly facing first surface of the bottom wall and coils of the coiled supply of welding wire extend around the center axis, the container further comprising a lid that at least partially blocks the top opening, the lid having a guide opening through which a free end of the welding wire is directed from the receptacle to externally thereof and through which the welding wire in the coiled supply of welding wire is drawn to cause the welding wire to pay off of the coiled supply of welding wire, wherein the lid has a wall with a downwardly facing surface portion that is substantially flat and resides in a plane that is substantially orthogonal to the center axis of the container receptacle and adjacent to the top edge of the peripheral wall with the lid and main body in a first relationship, the top opening having a first area, the downwardly facing surface portion of the wall extending over a substantial portion of the first area, wherein with the lid and main body in the first relationship, the downwardly facing surface and top of the coiled supply of welding wire are spaced vertically from each other sufficiently that the welding wire can be drawn off of the coiled supply of welding wire from the radially outwardly facing outside of the coiled supply of welding wire from where the welding wire is directed radially inwardly and upwardly through the guide opening without permanently changing an initial set for the welding wire, wherein the coiled supply of welding wire has a free end that extends through the guide opening and is exposed at an outside region of the container with the lid and main body in the first relationship wherein the first relationship is maintained from initial placement of the coiled supply of welding wire into the container for shipping and through dispensing.

2. The combination according to claim 1 wherein the downwardly facing surface portion of the lid wall extends over substantially the entire first area.

3. The combination according to claim 1 wherein the coiled supply of welding wire comprises a spool around and against which the welding wire is wrapped, the spool comprising a core with a central axis and first and second flanges connected to the core at first and second locations spaced axially relative to the central axis.

4. The combination according to claim 3 wherein the first flange is above the second flange with the coiled supply of welding wire in the operative position, the first flange has a peripheral edge and the peripheral edge is spaced from the radially inwardly facing second surface substantially fully around the vertical center axis and the welding wire is drawn off of the coiled supply of welding wire upwardly and around the peripheral edge.

5. The combination according to claim 4 wherein with the lid and main body in the first relationship, the downwardly facing surface portion and first flange are spaced vertically from each other by no more than 15 inches.

6. The combination according to claim 3 wherein there is no structure in the receptacle other than the spool to guide passage of the welding wire between the spool and the guide opening.

7. The combination according to claim 3 wherein the main body of the container and one of the first and second flanges cooperate to maintain a predetermined relationship between the main body and the one of the first and second flanges.

8. The combination according to claim 7 wherein with the main body and the one of the first and second flanges in the predetermined relationship, the central axis of the core and vertical center axis for the receptacle are substantially coincident, wherein as viewed along the central axis, the one of the first and second flanges and main body have different shapes.

9. The combination according to claim 1 wherein the guide opening is adjacent to or coincident with the vertical center axis.

10. The combination according to claim 9 wherein the container further comprises a nozzle at the guide opening through which the welding wire passes.

11. The combination according to claim 10 wherein the nozzle has a through passageway bounding the guide opening and the through passageway is bounded by a surface comprising a ceramic material.

12. The combination according to claim 10 wherein the nozzle comprises joinable parts that captively engage the container lid.

13. The combination according to claim 1 wherein the lid is removably connectable with the main body of the container, the lid having a continuous depending skirt with an axial extent which closely surrounds the peripheral outer surface of the main body over substantially the full axial extent so that the main body and lid are thereby frictionally maintained in the first relationship and guided, one against the other, as the lid and main body are moved axially relative to each other.

14. The combination according to claim 1 wherein the receptacle defined by the main body has a substantially uniform first cross-sectional configuration bounded by the radially inwardly facing second surface as viewed in a plane taken orthogonally to the vertical center axis between the bottom wall and a top edge, the top opening has a second cross-sectional configuration substantially matched to the first cross-sectional configuration, and the downwardly facing surface portion extends over substantially the entire first area of the top opening.

15. The combination according to claim 1 wherein the lid and main body of the container are telescopingly engaged, one within the other.

16. The combination according to claim 1 wherein the coiled supply of welding wire has a free end and a discrete length of the coiled supply of welding wire adjacent the free end is extended through the guide opening and releasably maintained in a shipping state at an outside region of the container.

17. The combination according to claim 16 wherein the discrete length of the coiled supply of welding wire in the shipping state is taped to the lid.

18. The combination according to claim 1 wherein the coiled supply of welding wire is not wrapped around a spool.

19. The combination according to claim 18 wherein there is no structure in the receptacle to guide passage of the welding wire between the coiled supply of welding wire and the guide opening.

20. The combination according to claim 1 wherein the radially inwardly facing second surface is polygonally shaped as viewed in cross section in a plane that is orthogonal to the vertical center axis.

21. The combination according to claim 1 wherein with the lid and main body in the first relationship, the downwardly facing surface and top of the coiled supply of wielding wire are spaced by at least 7 inches.

22. The combination according to claim 1 wherein with the lid and main body in the first relationship, the downwardly facing surfaces portion on the wall of the lid abuts the top edge of the peripheral wall.

23. A method of handling welding wire, the method comprising the steps of:
providing a coiled supply of welding wire having a central axis around which the welding wire is wrapped;
placing the coiled supply of welding wire in an operative position in a receptacle defined by a container having a wall structure, a lid, and a main body;
transporting the container with the coiled supply of welding wire in the operative position to a user site;
directing a free end of the welding wire through a guide opening in the lid of the container; and
causing the welding wire to be paid off of the coiled supply of welding wire by exerting a tensile force on the welding wire directed through the wall structure without requiring the welding wire to be guided by any structure between the coiled supply of welding wire and the guide opening wherein the lid has a wall with a downwardly facing surface portion that is adjacent to a top edge of a peripheral wall of the container in the operative position, wherein with the lid and main body in the operative position, a downwardly facing surface of the lid and a top of the coiled supply of welding wire are spaced vertically from each other sufficiently that the welding wire can be drawn off of the coiled supply of welding wire from a radially outwardly facing outside of the coiled supply of welding wire from where the welding wire is directed radially inwardly and upwardly through the guide opening without permanently changing an initial set for the welding wire, wherein the operative position is maintained from initial placement of the coiled supply of welding wire in the container for shipping and through dispensing.

24. The method of handling welding wire according to claim 23 wherein the step of directing the free end of the welding wire through the guide opening is carried out before the step of transporting the container to the user site.

25. The method of handling welding wire according to claim 24 further comprising the step of releasably securing a portion of the welding wire at or adjacent to the free end of the welding wire that is directed through the wall structure to the guide opening at an external location thereon.

26. The method of handling welding wire according to claim 25 further comprising the step of releasing the part of the welding wire secured at the external location on the wall structure at the user site before causing the welding wire to be paid off of the coiled supply of welding wire.

27. The method of handling welding wire according to claim 23 further comprising the step of providing a main body that defines at least a part of the receptacle and a lid on the main body to define the wall structure.

28. The method of handling welding wire according to claim 27 wherein the step of providing a lid comprises providing a lid that is releasably connectable to the main body.

29. The method of handling welding wire according to claim 28 wherein the steps of providing a lid and main body comprise providing a lid and main body that are telescopingly engageable, one with the other.

30. The method of handling welding wire according to claim 27 wherein the step of directing the free end of the welding wire through the guide opening comprises directing the free end of the welding wire through the lid.

31. The method of handling welding wire according to claim 27 wherein the step of providing a main body comprises providing a bottom wall and a peripheral wall that extends upwardly from the bottom wall to a free edge that extends around a top opening in communication with the receptacle and the step of providing a lid comprises providing a lid with a wall that spans the free edge to block the top opening.

32. The method of handling welding wire according to claim 31 wherein the wall on the lid has a substantially flat downwardly facing surface that spans the free edge.

33. The method of handling welding wire according to claim 23 wherein the step of providing a coiled supply of welding wire comprises providing a spool with a core around which the welding wire is wrapped.

34. The method of handling welding wire according to claim 23 wherein the step of providing a coiled supply of welding wire comprises providing a coiled supply of welding wire without a spool.

35. A method of handling welding wire, the method comprising the steps of:
providing a coiled supply of welding wire having a central axis around which the welding wire is wrapped;
placing the coiled supply of welding wire in an operative position in a receptacle defined by a container having a wall structure, a lid, and a main body,
transporting the container with the coiled supply of welding wire in the operative position to a user site;
directing a free end of the welding wire through a guide opening in the lid of the container;
releasably securing a portion of the welding wire at or adjacent to the free end of the welding wire that is directed through the guide opening to the wall structure at an external location thereon before transporting the container to a user's site at the user's site, releasing the part of the welding wire secured at the external location on the wall structure; and causing the welding wire to be paid off of the coiled supply of welding wire by exerting a tensile force on the welding wire projecting trough the guide opening in the wall structure.

36. The method of handling welding wire according to claim 35 wherein the step of releasably securing a pardon of the welding wire comprises taping a portion of the wielding wire to the wall structure.

* * * * *

UNITED STATES PATENT AND TRADEMARK OFFICE
CERTIFICATE OF CORRECTION

PATENT NO. : 7,191,968 B2 Page 1 of 1
APPLICATION NO. : 10/848634
DATED : March 20, 2007
INVENTOR(S) : Dieter Kuper It is certified that error appears in the above-identified patent and that said Letters Patent is hereby corrected as shown below:

Col. 13, line 29, "wielding" should be --welding--.

Col. 16, line 2, "pardon" should be --portion--.

Signed and Sealed this

Thirteenth Day of November, 2007

JON W. DUDAS
*Director of the United States Patent and Trademark Office*